United States Patent
Hong (10) Patent No.: US 8,391,856 B2
(45) Date of Patent: Mar. 5, 2013

(54) MOBILE COMMUNICATION SYSTEM AND CELL RESELECTION METHOD THEREOF

(75) Inventor: Tae Chul Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 214 days.

(21) Appl. No.: 12/829,888

(22) Filed: Jul. 2, 2010

(65) Prior Publication Data

US 2011/0143752 A1   Jun. 16, 2011

(30) Foreign Application Priority Data

Dec. 16, 2009  (KR) .................. 10-2009-0125622

(51) Int. Cl.
*H04W 4/00* (2009.01)

(52) U.S. Cl. ............ 455/427; 455/436; 455/435.2; 455/552.1; 455/412.1

(58) Field of Classification Search .......... 455/427–430, 455/12.1–13.4, 436–444
See application file for complete search history.

(56) References Cited

U.S. PATENT DOCUMENTS

| | | | |
|---|---|---|---|
| 6,157,834 A * | 12/2000 | Helm et al. | 455/436 |
| 6,233,451 B1 * | 5/2001 | Noerpel et al. | 455/427 |
| 6,233,463 B1 * | 5/2001 | Wiedeman et al. | 455/552.1 |
| 7,299,045 B2 | 11/2007 | Hsu et al. | |
| 2005/0170834 A1 * | 8/2005 | Dutta et al. | 455/436 |
| 2008/0227453 A1 | 9/2008 | Somasundaram et al. | |
| 2009/0047954 A1 | 2/2009 | Tenny et al. | |
| 2009/0067386 A1 | 3/2009 | Kitazoe | |
| 2009/0088160 A1 | 4/2009 | Pani et al. | |

FOREIGN PATENT DOCUMENTS

| | | |
|---|---|---|
| KR | 2006-0014631 A | 2/2006 |
| KR | 2007-0069930 A | 7/2007 |

* cited by examiner

*Primary Examiner* — Vladimir Magloire (74) *Attorney, Agent, or Firm* — Rabin & Berdo, P.C.

(57) ABSTRACT

Provided are a mobile communication system and a cell reselection method of a mobile communication terminal. The mobile communication system includes two or more communication systems using different transmission modes and a mobile communication terminal connectable to the two or more communication systems. The mobile communication terminal measures received signal strength of a satellite communication cell when being switched to an idle mode, divides priority of a satellite communication system using the measured received signal strength and location information of the mobile communication terminal, and sets a first threshold value necessary for cell reselection of the satellite communication system.

18 Claims, 6 Drawing Sheets

MOBILE COMMUNICATION SYSTEM AND CELL RESELECTION METHOD THEREOF

CROSS-REFERENCE TO RELATED APPLICATIONS

This application claims priority under 35 U.S.C. §119 to Korean Patent Application No. 10-2009-0125622, filed on Dec. 16, 2009, in the Korean Intellectual Property Office, the disclosure of which is incorporated herein by reference in its entirety.

TECHNICAL FIELD

The following disclosure relates to a mobile communication system and a cell reselection method of a mobile communication terminal, and in particular, to a mobile communication system including cells of a terrestrial communication system and a satellite communication system and a cell reselection method of a terminal in such mobile communication system.

BACKGROUND

As a method for supporting mobility of a terminal in a mobile communication system, there are a process called handover when the terminal is in an active mode and a cell reselection when the terminal is in an idle mode. The handover in the active mode is a method for supporting the mobility during communication, and the cell reselection is a method for supporting quick connection when communication is resumed from the idle mode.

While a cell reselection process used in a related-art 3GPP system considers only the same transmission mode, it has been modified into a cell reselection process in 3rd Generation Partnership Project Long Term Evolution (3GPP LTE), which allows to select cells of systems using different transmission modes.

The 3GPP cell reselection process is described in the 3GPP TS 36.304 "Evolved Universal Terrestrial Radio Access (E-UTRA) User Equipment (UE) procedures in idle mode (Release 8)".

Parameters used in 3GPP LTE to apply the cell reselection process are as follows.

$Thresh_{X-High}$: high threshold value applied to the same frequency and the same Radio Access Technology (RAT)

$S_{intraSearch}$: threshold value starting the search of the same frequency and the same RAT cell $Thresh_{X-Low}$: low threshold value applied to the same frequency and the same RAT $S_{nonintraSearch}$: threshold value starting the search of different frequency and different RAT cell $Thresh_{ServingLow}$: threshold value allowing to change the serving cell regardless of the priority when there is a cell satisfying a movement criteria 3GPP LTE describes that the above parameters are provided and set by a system. A general relation between the above parameters is as follows.

$$Thresh_{X-High} > S_{intraSearch} >$$
$$Thresh_{X-Low} > S_{nonintraSearch} > Thresh_{ServingLow}$$

The cell reselection process using these parameters is summarized as follows.

1. When the received signal strength of the serving cell has a value lower than $S_{intraSearch}$, signal measurements are obtained on cells of the same frequency of the same RAT.

2. When the received signal strength of the serving becomes lower than $S_{nonintraSearch}$, signal measurements are obtained on cells of the same RAT and different frequency and cells of different RAT. If there is a cell maintaining a value higher than the threshold value $Thresh_{X-High}$ for a certain time among cells having high priorities, then the cell is reselected.

3. When the received signal strength becomes lower than the threshold value $Thresh_{ServingLow}$, which means that the terminal cannot be connected to the current cell any longer, the terminal immediately moves to a possible cell that satisfies a reselection criteria.

The foregoing cell reselection process provides a cell reselection between various communication systems including terrestrial communication systems as well as 3GPP LTE. However, the process does not consider the characteristics of the satellite communication system. Thus, it results inefficiency in a communication system having both terrestrial communication system and satellite communication system.

SUMMARY

In one general aspect, a cell reselection method of a terminal in a mobile communication system including two or more communication systems using different transmission modes includes: measuring received signal strength of a satellite communication cell if the terminal is switched to an idle mode; dividing priority of a satellite communication system using the measured received signal strength and location information of the terminal; and setting a first threshold value necessary for cell reselection of the satellite communication system.

The cell reselection method may further include: comparing the received signal strength with the first threshold value; and comparing a value representing power variation of a received signal according to shadowing determined by the location information of the terminal with a second threshold value when the received signal strength is greater than the first threshold value. The measuring of received signal strength may include determining a mean value of a result obtained by repeated performance for a certain time to be the received signal strength.

Based on the location information of the terminal, the priority of the satellite communication system may be determined to exclude the satellite communication system when the terminal is located in an urban area surrounded by terrestrial cells, to be lower than priority of a terrestrial communication system when the terminal is located in a suburban area not only adjacent to terrestrial cells but also adjacent to areas that are not supported by terrestrial cells, and to be higher than the priority of the terrestrial communication system when the terminal is located in an area not supported by terrestrial cells. The priority of the satellite communication system may be determined to be lower than the priority of the terrestrial communication system when a service provided by the satellite communication system plays an auxiliary role of a service provided by the terrestrial communication system.

The cell reselection method may further include reselecting a cell according to the priority and the first threshold value. The location information of the terminal may be obtained by GPS or a cell ID of a terrestrial base station.

In another general aspect, a cell reselection method of a terminal in a mobile communication system including two or more communication systems using different transmission modes includes: determining whether the terminal connected to a satellite communication cell is switched to an idle mode; dividing priority of a satellite communication system using location information of the terminal; and setting a first threshold value necessary for cell reselection of the satellite communication system.

In still another general aspect, a mobile communication system includes: two or more communication systems using different transmission modes; and a mobile communication terminal connectable to the two or more communication systems, where the mobile communication terminal measures received signal strength of a satellite communication cell when being switched to an idle mode, divides priority of a satellite communication system using the measured received signal strength and location information of the mobile communication terminal, and sets a first threshold value necessary for cell reselection of the satellite communication system.

Other features and aspects will be apparent from the following detailed description, the drawings, and the claims.

BRIEF DESCRIPTION OF THE DRAWINGS

FIGS. 2 and 3 are diagrams illustrating received power variation in a satellite cell and a terrestrial cell, where

DETAILED DESCRIPTION OF EMBODIMENTS

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Received signal power of a terminal in a mobile communication system can be expressed as Equation (1) below.

$$P_{rs} = P_t G_{at} L^{-a} 10^{\frac{\theta}{10}} \tag{1}$$

where $P_{rs}$ is received signal power, $P_t$ is transmit signal power, $G_{at}$ is an antenna gain, L is a distance between a transmitter and a receiver, a is a path loss coefficient, and $\theta$ is a shadowing factor.

If the shadowing factor is not considered, in a terrestrial system, power variation of the received signal according to the antenna gain is not significant, but power variation of the received signal according to changes of the distance is significant.

On the other hand, in a satellite system, the power variation of the received signal according to the antenna gain variation is significant, but the power variation of the received signal according to a distance variation is insignificant. Since a GEO satellite is distant from the Earth by about 36,000 km, a variation of a distance between a satellite and a terminal is ignorable even when the terminal moves several kilometers on the Earth. Accordingly, the gain variation of the satellite antenna has to be considered in order to analyze the power variation of a satellite signal according to the movement of the terminal.

Figure 1:
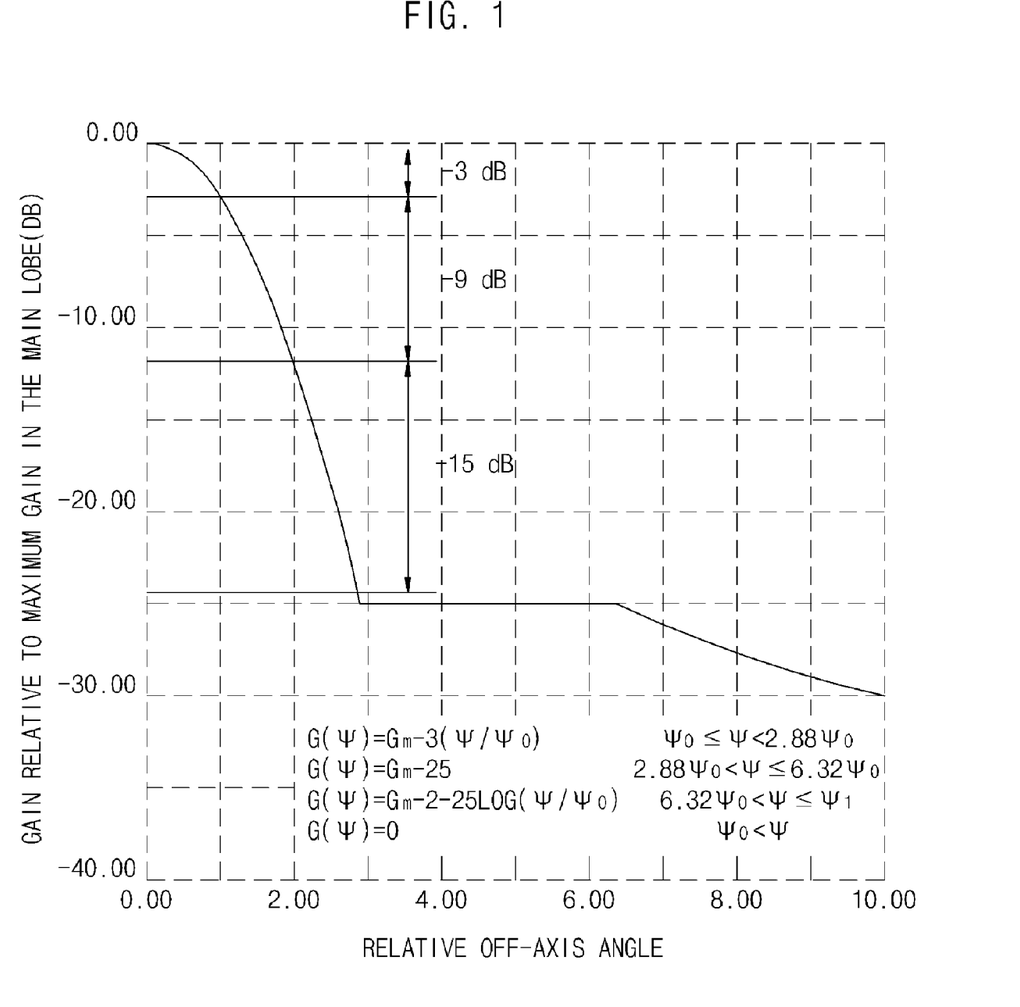
FIG. 1 is a graph illustrating a beam pattern of International Telecommunication Unit Radio communication Sector (ITU-R) recommendation satellite.

Looking at a reference beam pattern of a GEO satellite in the RECOMMENDATION ITU-R S.672-4, as shown in FIG. 1, the reduction speed of the antenna gain is greatest at the center of the beam. The reduction of the antenna gain at the center of the beam can be expressed as Equation (2) below.

$$G(\Psi) = G_m - 3(\Psi/\Psi_0)^2 \tag{2}$$

where $G_m$ is a maximum antenna gain, $\Psi_0$ is a Half Power Beam Width (HPBW), and $\Psi$ is an angle offset from the center of the beam. When $\Psi_0$ is about 1.5 degrees, a movement of about 20 km to about 100 km is necessary to reduce the antenna gain by about 1 dB. Accordingly, it can be understood that the variation of the antenna gain due to the movement of a terrestrial cell size can hardly affect the average received signal power.

Figure 2:
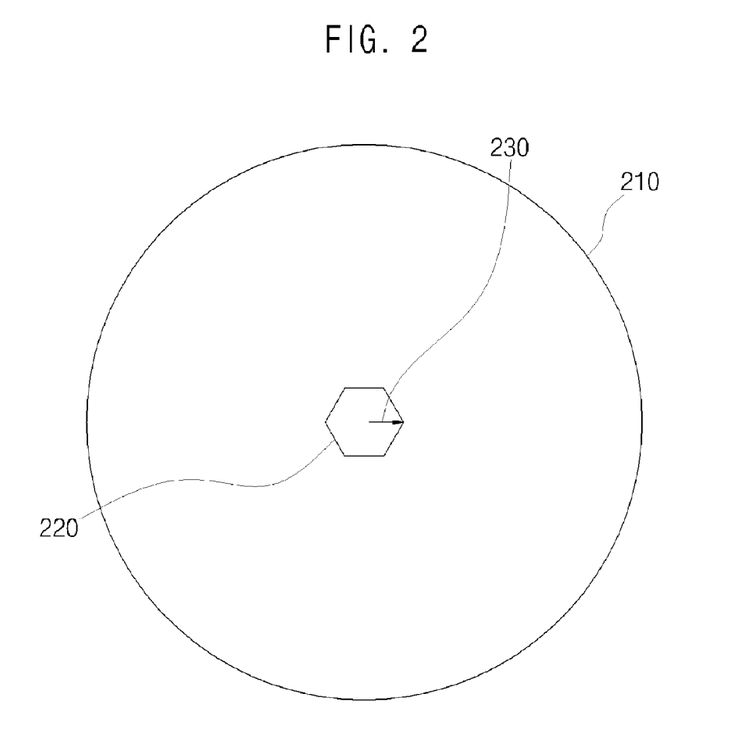
FIG. 2 is a diagram illustrating a movement of a terminal in the satellite cell and the terrestrial cell.
Figure 3:
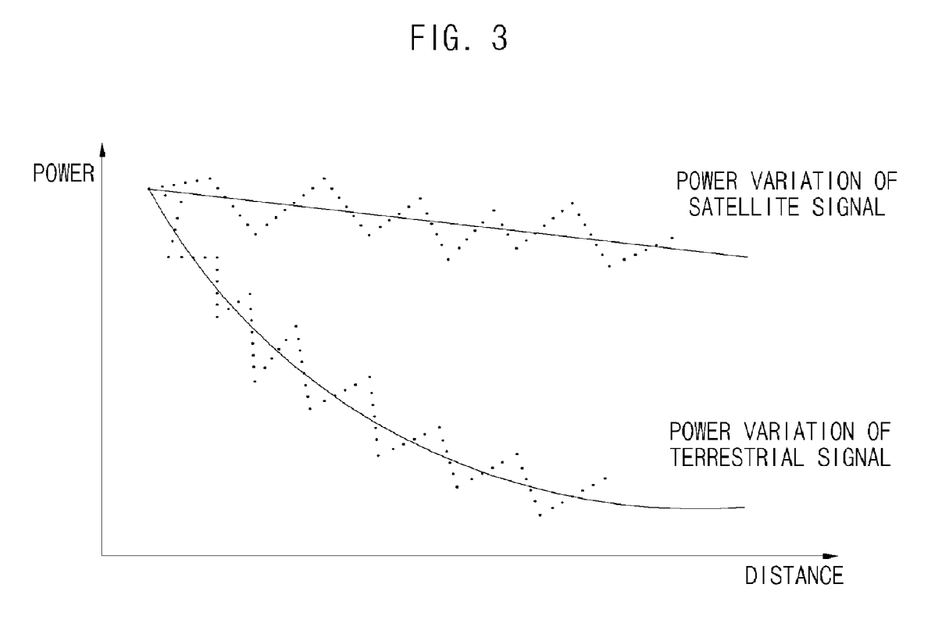
FIG. 3 is a graph illustrating a power variation according to the movement of the terminal.

Based on the above description, FIGS. 2 and 3 shows an example of power variation of the received signal in a terrestrial communication system and satellite communication system when a terminal moves the same distance in a terrestrial cell. An arrow 230 of FIG. 2 represents a movement direction of the terminal. Dotted lines in FIG. 3 show fading changes due to the shadowing, and solid lines represent mean values of the received signal power.

As shown in FIG. 2, when the terminal moves in a terrestrial cell 220 in a satellite cell 210, the power variation of the received signal from the satellite communication system is affected by the shadowing more than the distance as shown in FIG. 3. Accordingly, the power Ps of the satellite received signal in the terrestrial cell can be expressed as Equation (3) below.

$$P_s = P_{rs}' + \Delta P_{SF} \tag{3}$$

where $P_{rs}'$ is a received signal power that does not consider the shadow fading, which can be assumed as a constant, and $\Delta P_{SF}$ is a parameter reflecting an influence by the shadow fading.

Figure 4:
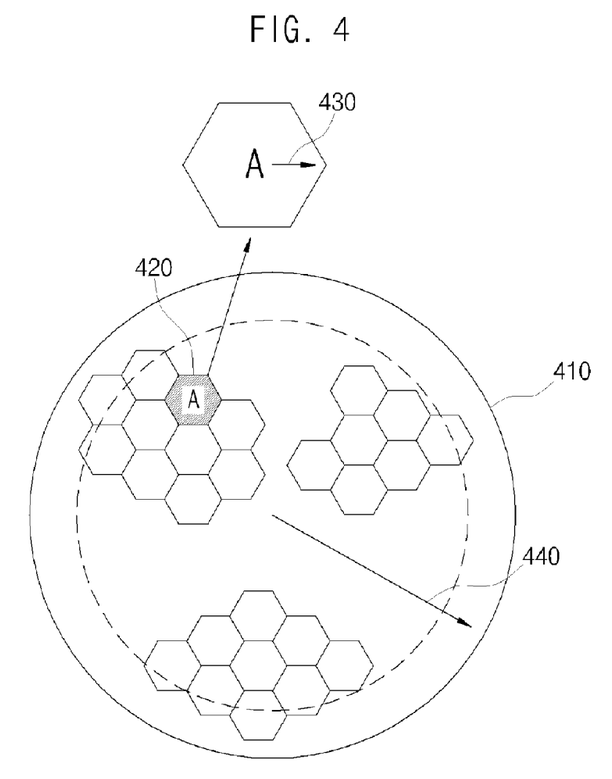
FIG. 4 is a diagram illustrating arrangements of satellite cells and terrestrial cells.

Based on this fact, the power variation of the received signal can be predicted in a situation where the terrestrial cell and the satellite cell coexist as shown in FIG. 4. In this case, it is assumed that the received signal power from the satellite is identical in a part between circles shown in FIG. 4.

The received signal power decreases in both a terrestrial cell 420 and a satellite cell 410 as the terminal moves outward. Here, arrows 430 and 440 represent the movement directions of the terminal in the terrestrial cell 420 and the satellite cell 410, respectively. The received signal strength decreases as the terminal moves in the arrow direction. However, since the received signal power decreased according to the distance is insignificant due to the antenna beam pattern, it can be determined that the received signal strength is almost uniform in one terrestrial cell inside the satellite cell.

Examples of representative services using the satellite communication system include ground network fill-in and Multimedia Broadcast Multicast Service (MBMS). When services are provided in the urban center through an apparatus like a gap filler, MBMS can be recognized as an independent service such as satellite DMB not an auxiliary service of the ground service. On the other hand, since the ground network fill-in provides a communication service at a place where the communication service can not be provided through a ground network, the ground network may play an auxiliary role of the terrestrial communication system. Accordingly, these service purposes should be considered when priorities of the satellite cells are reflected in case where a terminal performs cell reselection.

Figure 5:
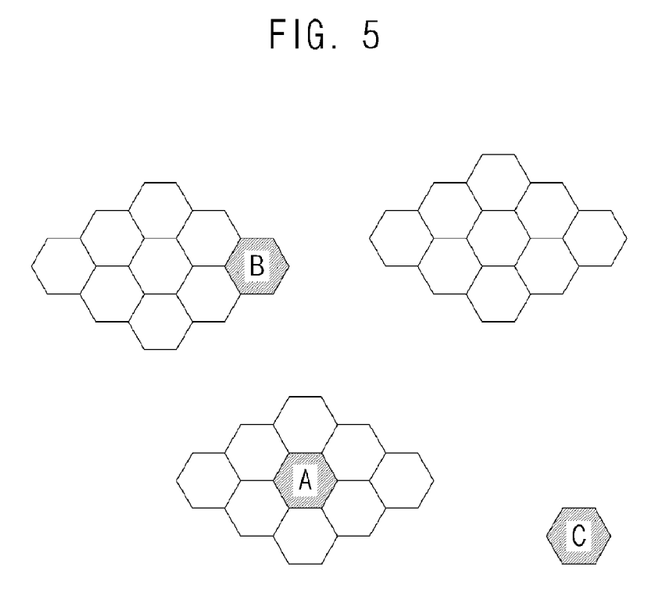
FIG. 5 is a diagram illustrating an exemplary distribution of terrestrial cells.

FIG. 5 shows an example of a terrestrial cell distribution. Generally, the terrestrial cells are distributed densely in metro area, but sparsely in small town. For the area between the metro and the small town, a method for magnifying the cell size by increasing the transmission power of a terrestrial outer cell is usually used. In this case, the communication quality may be reduced, or it may be impossible to provide the communication service. That is, while power of a base station is enough, power of a terminal may be deficient.

An area A of FIG. 5 may be considered as the urban center surrounded by terrestrial cells. Since there are enough selectable terrestrial cells in this area and the received power of a satellite signal is considerably reduced due to many buildings in the urban center, it is desirable to reduce power consumption of a terminal by ignoring a satellite cell in cell reselection.

On the other hand, since an area B of FIG. 5 is adjacent to terrestrial cells, but also are adjacent to areas where the terrestrial cell are not supported, the reselection of the satellite cell has to be considered. In the area B, either the terrestrial cell or the satellite cell may be selected according to the movement direction of a user. Since the terrestrial communication system can provide higher speed data services than the satellite communication system through various techniques such as Multiple Input and Multiple Output (MIMO), it is desirable that the satellite cell is selected with a lower priority.

An area C of FIG. 5 does not have any adjacent terrestrial cells. In this case, it is desirable that the satellite cell is selected with a higher priority.

In addition, a method for reducing the use of a terminal's battery may be considered. That is, the satellite cell may be continuously maintained at a place where the terrestrial cells are sparsely distributed, but the terrestrial cell may be selected at a place where the terrestrial cells are abundant. The priorities of the satellite cell according to the location of the terminal are described in Table 1 below.

TABLE 1

| Location | Priority of Satellite Cell (Beam) |
| --- | --- |
| Urban Cells | Satellite Cell Excluded |
| Suburban Cells | Lower Priority |
| Few Adjacent Terrestrial Communication Network Cells | Higher Priority |

In order to reflect the priority according to the location of the terminal, the location information can be acquired using a GPS chip of the terminal, or the substantial location of the terminal can be estimated using a base station ID of the terrestrial cell.

When the terminal is connected to the terrestrial cell, the satellite cell can be appropriately selected by adjusting a threshold value $Thresh_{X-Low}$ using information on the user location and the mean value of the received signal. At this time, the foregoing priority is reflected.

Accordingly, when the terminal is connected to the terrestrial cell, cell reselection parameters related to the satellite cell have to be set by performing the measurement when the terminal enters an initial idle mode regardless of the threshold value or the priority of the satellite cell.

When a user is located in a place where there are few terrestrial cells, similarly to "any cell selection" mode of 3GPP LTE, the satellite cell may be measured identically to the terrestrial intra-frequency, and may be selected by applying the threshold value $Thresh_{X-High}$. When the priority of the satellite cell is increased, unnecessary measurements can be prevented to save available terminal's battery power.

Figure 6:
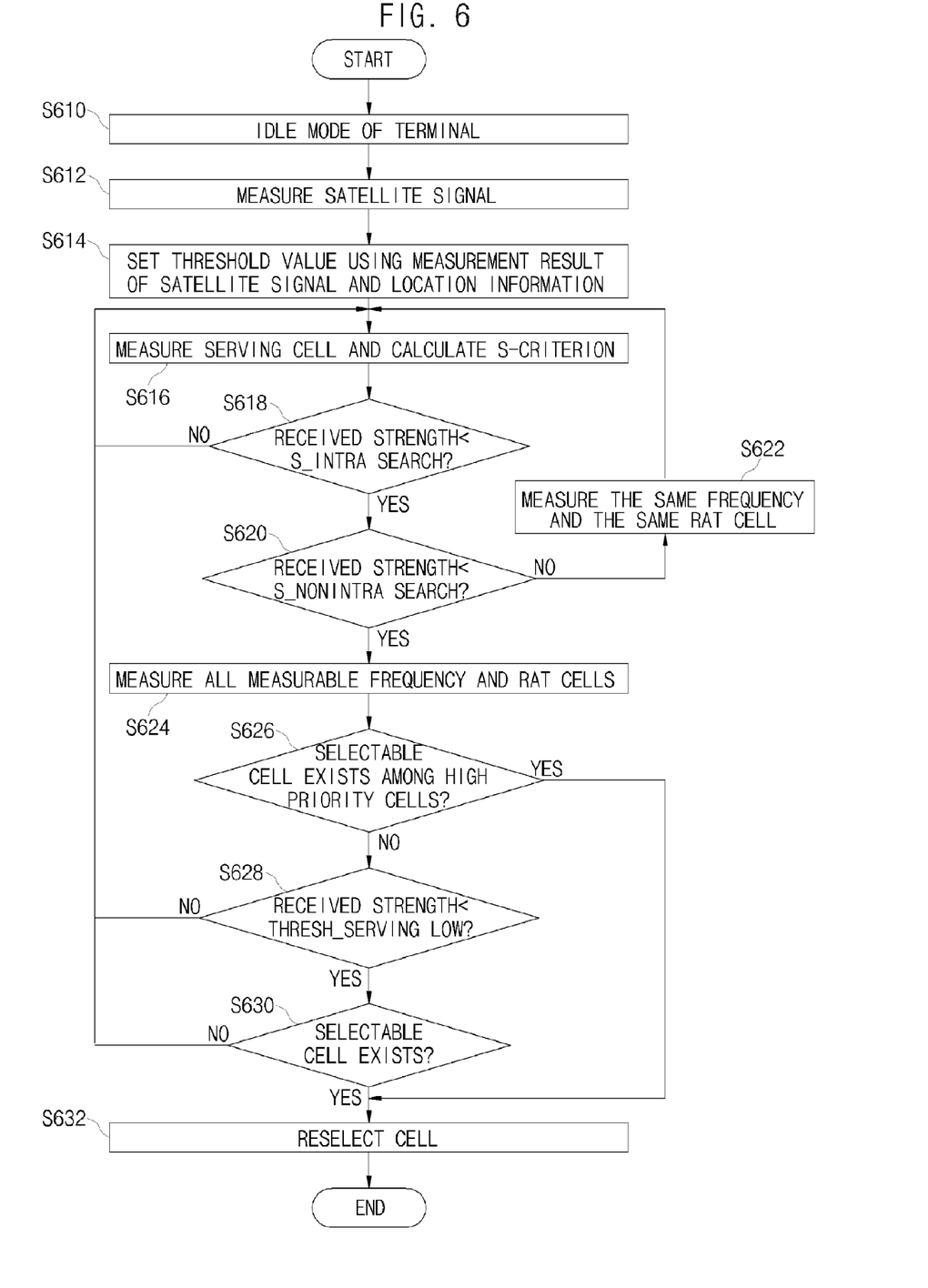
FIG. 6 is a flowchart illustrating a cell reselection process in case where a terminal is connected to a terrestrial cell in a cell reselection method according to an exemplary embodiment.

FIG. 6 is a flowchart illustrating a cell reselection process in case where a terminal is connected to a terrestrial cell.

In operation S610, a terminal enters the idle mode, and then a satellite signal is measured to check if there is a satellite cell in operation S612. In operation S614, when the satellite signal is measured, a threshold value may be set based on the measurements and user's location information in operation S614.

The user's location information may be acquired by GPS, or may be verified through a Cell ID of a terrestrial base station. Also, the threshold value of operation S614, as described above, may be set with $Thresh_{X-Low}$ or $Thresh_{X-High}$ according to the user's location.

After all the parameters with respect to the satellite cell are set, the measurement on a serving cell is performed to calculate the received signal strength in operation S616.

In operation S618, the received signal strength is compared with $S_{intraSearch}$. If the received signal strength is greater than $S_{intraSearch}$, a cell reselection process is not performed.

If the received signal strength is smaller than $S_{intraSearch}$, it is determined whether the received signal strength is smaller than $S_{nonintraSearch}$ in operation S620. If the received signal strength is smaller than $S_{intraSearch}$ and is greater than $S_{nonintraSearch}$, the cell measurement is performed on the same frequency and the same RAT in operation S622.

If the received signal strength is smaller than $S_{nonintraSearch}$, the measurement is performed on all connectable frequencies and RATs in operation S624.

After the measurement is performed, in operation S626, it is determined whether a selectable cell exists among cells with the high priority, that is, candidates cells using the threshold value $Thresh_{X-High}$.

If there is a cell corresponding to the high priority in operation S626, the corresponding cell is reselected in operation S632. If there is no cell corresponding to the high priority, it is determined whether the received signal strength is smaller than $Thresh_{ServingLow}$ in operation S628.

If the received signal strength is greater than $Thresh_{ServingLow}$ in operation S628, a cell reselection is not performed. If the received signal strength is smaller than $Thresh_{ServingLow}$, it is determined on all cells whether a selectable cell exists in operation S630.

If there is a selectable cell, the cell reselection is performed in operation S632. Otherwise, the cell reselection is not performed.

The method for setting the threshold value based on the location information and the result from the measurement of the satellite signal in operation S614 has been described. However, the threshold value to be applied in reality is preferably determined by repeating the measurement on the satellite cell whenever the measurement on the serving cell and acquiring the mean value of the satellite signals. That is, the threshold value may be updated by repeating operation S614 after operation S616 for measuring the serving cell.

Figure 7:
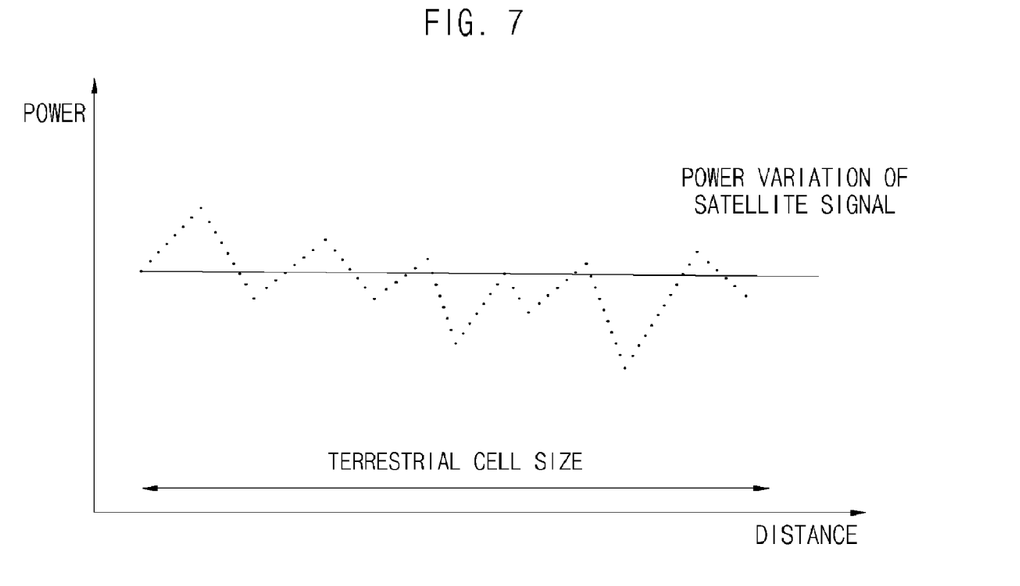
FIG. 7 is a graph illustrating a power variation of a received signal from a satellite communication system.

In the satellite cell, it is determined by applying two criterions whether there is a selectable cell in operations S626 and S630. As described above, in the satellite cell, the power variation of the received signal according to the shadowing is greater than that according to the change of the distance caused by the movement of a user. FIG. 7 is a graph illustrating a power variation of a received signal according to the shadowing. Here, the solid line represents the power variation of a satellite signal according to the distance, and the dotted line represents the power variation of the satellite signal according to the shadowing.

As described in FIG. 7, since the average power is almost constant and the communication quality is affected by the fading change according to the communication environment, it is necessary to predict and reflect the shadowing environment according to the user location when considering selection of the satellite communication system.

Accordingly, two criterions of whether to have the received signal strength above the basic threshold value and the tendency of the power variation of a received signal according to the shadowing have to be considered to determine the connectivity of the satellite cell. That is, when a user is located in a subcenter of an urban area, the degree of the power variation of the received signal may vary according to whether there are large buildings.

If the power variation of the received signal complies with the normal distribution, a method used in the statistical analysis can be applied. If the average received signal power minus two times the standard deviation is greater than the required threshold value $Thresh_{X-Low}$ or $Thresh_{X-High}$, a greater received signal power than the threshold value required in a probability of about 95% can be provided. That is, when two times the standard deviation of the received signal power varying with the shadowing is smaller than the threshold value for the shadowing as described in the following equation, it is desirable to select the satellite cell.

2*SD(Standard Deviation)<ThreshShadowing

Generally, the threshold value for the shadowing may be set with the average received signal power minus the required threshold value $Thresh_{X-Low}$ or $Thresh_{X-High}$.

However, an adaptive setting method can also be used according to the location of the user. For example, the satellite cell may be selected only when the user is located in a good place for the satellite communication by setting a smaller value when there are more terrestrial cells. On the contrary, the satellite may be quickly selected by setting a greater value when there are few terrestrial cells.

Figure 8:
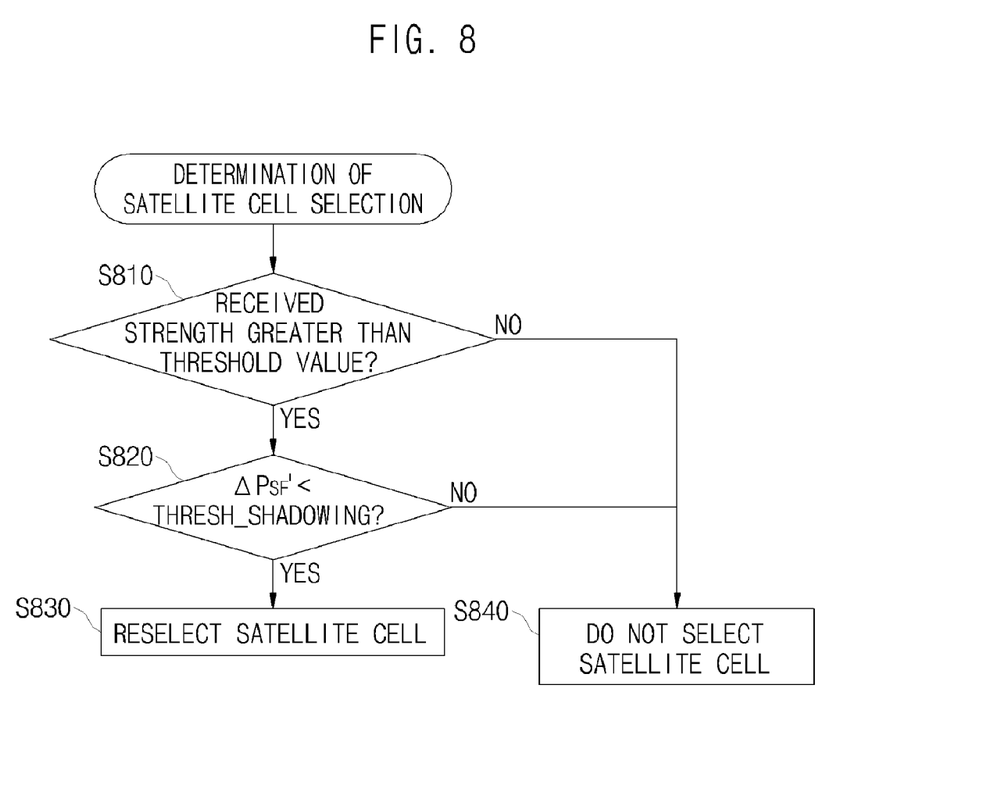
FIG. 8 is a flowchart illustrating a process for selecting a satellite cell in a cell reselection method according to an exemplary embodiment.

FIG. 8 is a flowchart illustrating a process for selecting the satellite cell.

In operation S810, it is determined whether the received signal strength is greater than the threshold value. If the received signal strength is smaller than the threshold value, the satellite cell is not selected in operation S840.

If the received signal strength is greater than the threshold value, it is determined whether an influence by the shadowing is smaller than the threshold value in operation S820. That is, when a parameter ΔSF' reflecting the power variation of the received signal is smaller than the threshold value, the satellite cell may not be selected in operation S840. In operation S830, the satellite cell may be reselected only when the parameter ΔSF' is greater than the threshold value. Here, ΔSF' is assumed to be 2*SD, but it will be understood that other kinds of values reflecting the power variation of the received signal may be applied by a system operator.

When a terminal is connected to the satellite cell, the priority of the satellite cell as described above may be reflected by adjusting the threshold values $S_{intraSearch}$ and $S_{nonintraSearch}$ according to the location.

When a terminal is located in a place where there are many terrestrial cells, the probability of reselecting the terrestrial cell may be increased. When the terminal is located in a place where there are few terrestrial cells, connection maintenance probability of the satellite cell may be increased. When the satellite has a high priority (when the connection maintenance probability of the satellite cell is increased) or a low priority (when the reselection probability of the terrestrial cell is increased), $S_{intraSearch}$ and $S_{nonintraSearch}$ can be defined as follows.

Satellite Having a High Priority $S_{intraSearch}$: MIN(average power−A, $Thresh_{ServingLow}$+C)

$S_{nonintraSearch}$: MIN(average power−B, $Thresh_{ServingLow}$+D)

Satellite Having a Low Priority $S_{intraSearch}$: MAX(average power−A', $Thresh_{ServingLow}$ C')

$S_{nonintraSearch}$: MAX(average power−B', $Thresh_{ServingLow}$+D')

A, B, C, and D, and A', B', C', and D' may be values set by an operator.

When the satellite has a high priority, it is desirable that $S_{intraSearch}$ and $S_{nonintraSearch}$ have value approximate to $Thresh_{ServingLow}$ to maintain satellite communication. However, when $S_{intraSearch}$ and $S_{nonintraSearch}$ have values identical to or substantially similar to $Thresh_{ServingLow}$, it is difficult to reselect a different cell at an appropriate time. Accordingly, a more careful consideration is required.

On the other hand, when the satellite has a low priority, an operation in 'any cell selection' may be performed by adjusting only $S_{intraSearch}$ and $S_{nonintraSearch}$, or a method for adjusting $Thresh_{ServingLow}$ together may be considered. In order to reflect a low priority, the threshold values of $S_{intraSearch}$, $S_{nonintraSearch}$, and $Thresh_{ServingLow}$ are allowed to have great values, thereby searching for and reselecting a terrestrial cell more quickly. Accordingly, A and B are allowed to have relatively greater values, and C and D may be allowed to have relatively smaller values. On the other hand, A' and B' may be allowed to have relatively smaller values, and C' and D' are allowed to have relatively greater values.

Exemplary parameters set using the statistical analysis based on the standard deviation are described as follows, but embodiments are not limited thereto. It will be understood that the parameters for actual application should be appropriately determined in consideration of an operating environment.

A=SD, B=2*SD, C=SD , D=0.5*SD

A'=0.5*SD, B'=SD, C'=2*SD, D'=SD

In all of the examples proposed herein, the same SD standard has been applied to A, B, C, D, A', B', C', and D', but different SD standards may be applied to A, B, C, D and A', B', C', and D' in an actual system operation. A method for selecting an SD value may also be determined in consideration of the average of the received strength, the user's location, and the relative priority. As described above, other kinds of values that reflect the power variation of the received signal may be applied by a system operator instead of the standard deviation.

Figure 9:
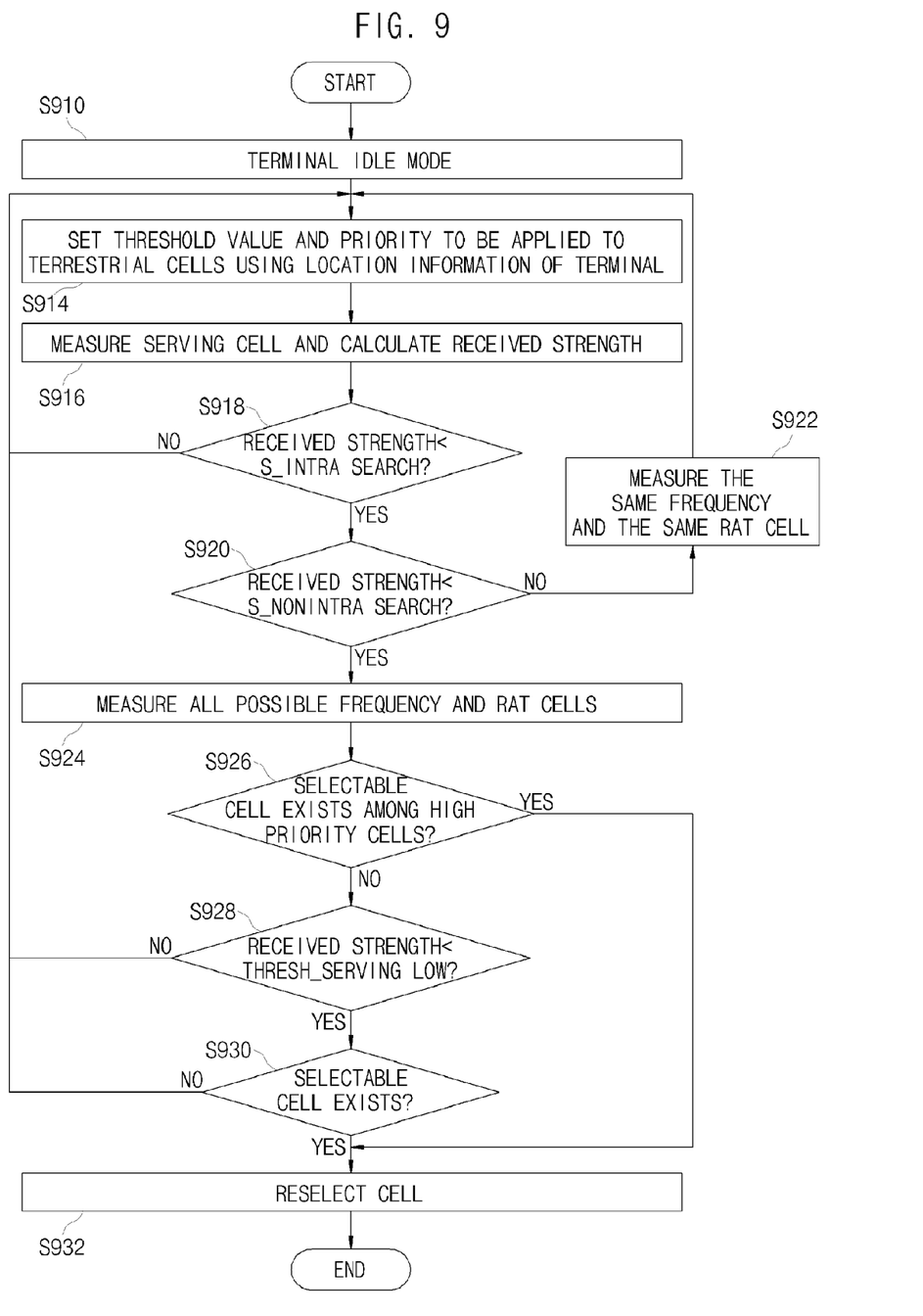
FIG. 9 is a flowchart illustrating a cell reselection process in case where a terminal is connected to a satellite cell in a cell reselection method according to an exemplary embodiment.

FIG. 9 is a flowchart illustrating a cell reselection process in case where a terminal is connected to a satellite cell.

When a terminal enters the idle mode in operation S910, the priority and threshold value to be applied to terrestrial cells using the location information of the terminal are set in operation S914. In this case, since the terrestrial cells are being connected to a satellite cell, the existing measurement values may be immediately applied to the setting of the threshold value.

In operation S916, the measurement of a serving cell is performed, and the received signal strength is calculated. In operation S918, the received signal strength is compared with $S_{intraSearch}$. If the received signal strength is greater than $S_{intraSearch}$, the cell reselection is not performed.

If the received signal strength is smaller than $S_{intraSearch}$, the received signal strength is compared with $S_{nonintraSearch}$ in operation S920. If the received signal strength is greater than $S_{nonintraSearch}$, the measurement of the same frequency and the same RAT cell is performed in operation S922. If the received signal strength is smaller than $S_{nonintraSearch}$, the measurement of all possible frequency RAT cells is performed in operation S924.

In operation S926, it is determined based on the measurement result whether there is a selectable cell among cell having high priorities. If there is a selectable cell, the cell reselection is performed in operation S932.

If there is no selectable cell, it is determined whether the received signal strength is smaller than $Thresh_{ServingLow}$ in operation S928. If the received signal strength is greater than $Thresh_{ServingLow}$, the cell reselection is not performed. If the received signal strength is smaller than $Thresh_{ServingLow}$, it is determined whether there is a reselectable cell among all the priority cells in operation S930. In this case, if there is a selectable cell, the cell reselection is performed in operation S932. Otherwise, the cell reselection is not performed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cell reselection method, comprising:
   measuring received signal strength of a satellite communication cell based at least partly on a terminal of a mobile communication system being switched to an idle mode;
   determining priority of a satellite communication system relative to at least one terrestrial communication system using the measured received signal strength and location information of the terminal with respect to the at least one terrestrial communication system;
   setting a first threshold value for cell reselection of the satellite communication system;
   comparing the received signal strength with the first threshold value; and
   comparing a value representing power variation of a received signal according to shadowing determined by the location information of the terminal with a second threshold value when the received signal strength is greater than the first threshold value.

2. The cell reselection method of claim 1, wherein the measuring of received signal strength comprises determining a mean value of a result obtained by repeated performance for a certain time to be the received signal strength.

3. The cell reselection method of claim 1, wherein, in the measuring of received signal strength, the terminal is connected to a terrestrial communication cell.

4. The cell reselection method of claim 1, wherein, based at least partly on the location information of the terminal, the priority of the satellite communication system is determined:
   to exclude the satellite communication system based at least partly on the terminal being located in an area surrounded by terrestrial cells,
   to be lower than priority of a terrestrial communication system based at least partly on the terminal being located in an area supported by terrestrial cells, and
   to be higher than the priority of the terrestrial communication system based at least partly on the terminal being located in an area not supported by terrestrial cells.

5. The cell reselection method of claim 1, wherein the priority of the satellite communication system is determined to be lower than a priority of the terrestrial communication system based at least partly on a service provided by the satellite communication system playing a role auxiliary to a service provided by the terrestrial communication system.

6. The cell reselection method of claim 1, further comprising reselecting a cell according to the priority and the first threshold value.

7. The cell reselection method of claim 1, wherein the location information of the terminal is obtained by GPS (Global Positioning System) or a cell identifier of a terrestrial base station.

8. A cell reselection method, comprising:
   determining whether a terminal in a mobile communication system connected to a satellite communication cell is switched to an idle mode;
   determining priority of a satellite communication system relative to a terrestrial communication system using location information of the terminal, at least partly in response to determining that the terminal is switched to the idle mode;
   setting a first threshold value for cell reselection of the satellite communication system;
   comparing a received signal strength of the satellite communication cell with the first threshold value; and
   comparing a value representing power variation of a received signal according to shadowing determined by the location information of the terminal with a second threshold value when the received signal strength is greater than the first threshold value.

9. The cell reselection method of claim 8, wherein, based at least partly on the location information of the terminal, the priority of the satellite communication system is determined:
   to exclude the satellite communication system based at least partly on the terminal being located in an area surrounded by terrestrial cells,
   to be lower than priority of a terrestrial communication system based at least partly on the terminal being located in an area supported by terrestrial cells, and
   to be higher than the priority of the terrestrial communication system based at least partly on the terminal being located in an area not supported by terrestrial cells.

10. The cell reselection method of claim 8, wherein the priority of the satellite communication system is determined to be lower than a priority of the terrestrial communication system based at least partly on a service provided by the satellite communication system playing a role auxiliary to a service provided by the terrestrial communication system.

11. The cell reselection method of claim 8, further comprising reselecting a cell according to the priority and the first threshold value.

12. The cell reselection method of claim 8, wherein the location information of the terminal is obtained by GPS or a cell ID of a terrestrial base station.

13. A mobile communication system comprising:
two or more communication systems using different transmission modes; and
a mobile communication terminal connectable to the two or more communication systems, wherein the mobile communication terminal
measures received signal strength of a satellite communication cell at least partly in response to being switched to an idle mode,
determines priority of a satellite communication system relative to a terrestrial communication system using the measured received signal strength and location information of the mobile communication terminal,
sets a first threshold value for cell reselection of the satellite communication system,
compares the received signal strength with the first threshold value, and
based at least partly on the received signal strength being greater than the first threshold value, compares a value representing power variation of a received signal according to shadowing determined by the location information of the mobile communication terminal with a second threshold value.

14. The mobile communication system of claim 13, wherein the mobile communication terminal determines a mean value of a result obtained by repeating the measurement of the received signal strength for a certain time to be the received signal strength.

15. The mobile communication system of claim 13, wherein, based at least partly on the location information of the mobile communication terminal, the priority of the satellite communication system is determined:
to exclude the satellite communication system based at least partly on the mobile communication terminal being located in an area surrounded by terrestrial cells,
to be lower than priority of a terrestrial communication system based at least partly on the mobile communication terminal being located in an area supported by terrestrial cells, and
to be higher than the priority of the terrestrial communication system based at least partly on the mobile communication terminal being located in an area not supported by terrestrial cells.

16. The mobile communication system of claim 13, wherein the priority of the satellite communication system is determined to be lower than the priority of the terrestrial communication system based at least partly on a service provided by the satellite communication system playing a role auxiliary to a service provided by the terrestrial communication system.

17. The mobile communication system of claim 13, wherein the mobile communication terminal reselects a cell according to the priority and the first threshold value.

18. The mobile communication system of claim 13, wherein the location information of the mobile communication terminal is obtained by GPS or a cell ID of a terrestrial base station.

\* \* \* \* \*